(12) United States Patent
Matsuzawa

(10) Patent No.: US 8,125,694 B2
(45) Date of Patent: Feb. 28, 2012

(54) METHOD OF DETERMINING NUMBER OF PATCHES

(75) Inventor: Yoshihiko Matsuzawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 554 days.

(21) Appl. No.: 12/368,099

(22) Filed: Feb. 9, 2009

(65) Prior Publication Data

US 2009/0201562 A1 Aug. 13, 2009

(30) Foreign Application Priority Data

Feb. 13, 2008 (JP) ................................. 2008-032151

(51) Int. Cl.
*H04N 1/46* (2006.01)
(52) U.S. Cl. ......... 358/504; 358/406; 358/518; 358/520
(58) Field of Classification Search .................. 358/504, 358/406, 1.9, 518, 520, 3.23; 347/19; 345/590
See application file for complete search history.

(56) References Cited

U.S. PATENT DOCUMENTS

| | | | | |
|---|---|---|---|---|
| 6,494,557 B1 * | 12/2002 | Kato et al. | ....................... | 347/19 |
| 7,003,151 B2 * | 2/2006 | Shimada | ....................... | 382/162 |
| 7,403,305 B2 * | 7/2008 | Nakajima | ....................... | 358/1.9 |
| 2004/0114165 A1 * | 6/2004 | Nakajima | ....................... | 358/1.9 |
| 2009/0168084 A1 * | 7/2009 | Seto | ............................... | 358/1.9 |

FOREIGN PATENT DOCUMENTS

JP 2006-237987 9/2006

* cited by examiner

*Primary Examiner* — Kimberly A Williams
(74) *Attorney, Agent, or Firm* — DLA Piper LLP (US)

(57) ABSTRACT

A test chart used for color calibration includes: the number of patches of a first color; and the number of patches of a second color. The number of patches of the first color is determined on the basis of the degree of variation in the colorimetric value of the first color in a color space on a medium, and the number of patches of the second color is determined on the basis of the degree of variation in the colorimetric value of the second color in the color space on the medium.

16 Claims, 11 Drawing Sheets

FIG. 5

SUB-SCANNING DIRECTION ←→

MAIN SCANNING DIRECTION ↕

| C | | | | M | | | | LLK | | | |
|---|---|---|---|---|---|---|---|---|---|---|---|
| 0 | 127 | 128 | 255 | 0 | 127 | 128 | 255 | 0 | 127 | 128 | 255 |
| 1 | 126 | 129 | 254 | 1 | 126 | 129 | 254 | 1 | 126 | 129 | 254 |
| 2 | 125 | 130 | 253 | 2 | 125 | 130 | 253 | 2 | 125 | 130 | 253 |
| 3 | 124 | 131 | 252 | 3 | 124 | 131 | 252 | 3 | 124 | 131 | 252 |
| 4 | 123 | 132 | 251 | 4 | 123 | 132 | 251 | 4 | 123 | 132 | 251 |
| 5 | 122 | 133 | 250 | 5 | 122 | 133 | 250 | 5 | 122 | 133 | 250 |
| 6 | 121 | 134 | 249 | 6 | 121 | 134 | 249 | 6 | 121 | 134 | 249 |
| 7 | 120 | 135 | 248 | 7 | 120 | 135 | 248 | 7 | 120 | 135 | 248 |
| 8 | 119 | 136 | 247 | 8 | 119 | 136 | 247 | 8 | 119 | 136 | 247 |
| 9 | 118 | 137 | 246 | 9 | 118 | 137 | 246 | 9 | 118 | 137 | 246 |
| 10 | 117 | 138 | 245 | 10 | 117 | 138 | 245 | 10 | 117 | 138 | 245 |
| 11 | 116 | 139 | 244 | 11 | 116 | 139 | 244 | 11 | 116 | 139 | 244 |
| 12 | : | : | : | 12 | : | : | : | 12 | : | : | : |
| : | : | : | : | : | : | : | : | : | : | : | : |
| : | : | : | : | : | : | : | : | : | : | : | : |
| : | : | : | : | : | : | : | : | : | : | : | : |
| : | : | : | : | : | : | : | : | : | : | : | : |
| : | : | : | : | : | : | : | : | : | : | : | : |
| : | : | : | : | : | : | : | : | : | : | : | : |
| 62 | 65 | 190 | 193 | 62 | 65 | 190 | 193 | 62 | 65 | 190 | 193 |
| 63 | 64 | 191 | 192 | 63 | 64 | 191 | 192 | 63 | 64 | 191 | 192 |

FIG. 6

| $E_{vr\_ave}$ | | RATIO | NUMBER OF PATCHES CALCULATED FROM $E_{vr\_ave}$ | NUMBER OF PATCHES |
|---|---|---|---|---|
| C | 0.8918 | 0.1344 | 40.31192 | 40 |
| M | 1.0825 | 0.1631 | 48.93206 | 49 |
| Y | 1.0065 | 0.1517 | 45.49631 | 45 |
| K | 1.2322 | 0.1857 | 55.70127 | 57(56) |
| LC | 0.6658 | 0.1003 | 30.09516 | 30 |
| LM | 0.6949 | 0.1047 | 31.41135 | 31 |
| LK | 0.6142 | 0.0925 | 27.76293 | 28 |
| LLK | 0.4488 | 0.0676 | 20.28899 | 20 |
| TOTAL | 6.6367 | 1.0000 | TOTAL NUMBER OF PATCHES | 300(299) |

FIG. 12

| INK COLOR | $E_{rt}$ | NUMBER OF PATCHES CALCULATED FROM $E_{rt}$ | NUMBER OF PATCHES CALCULATED FROM $E_{rt}$ AND $E_{vr}$ | |
|---|---|---|---|---|
| | | CALCULATION | CALCULATION | NUMBER OF PATCHES |
| C | 119.618 | 48.18935 | 44.25064 | 44 |
| M | 120.4781 | 48.52865 | 48.73036 | 50 (49) |
| Y | 117.6222 | 47.40201 | 46.44916 | 46 |
| K | 96.38967 | 39.02576 | 47.36352 | 47 |
| LC | 86.94162 | 35.2985 | 32.69683 | 33 |
| LM | 81.74984 | 33.25034 | 32.33085 | 32 |
| LK | 77.65925 | 31.6366 | 29.69977 | 30 |
| LLK | 39.71805 | 16.66878 | 18.47889 | 18 |
| TOTAL | 740.1767 | | TOTAL NUMBER OF PATCHES | 300 (299) |

METHOD OF DETERMINING NUMBER OF PATCHES

BACKGROUND

1. Technical Field

The present invention relates to a method of determining a number of patches.

2. Related Art

Color printers capable of printing a plurality of colors have come into widespread use. In a color printer, color calibration is performed in order to improve color reproducibility. When color calibration is performed, a test chart for color calibration is printed. The color of the test chart is measured to acquire a colorimetric value in a color space, and the misalignment of the colors printed by the printer is corrected on the basis of the colorimetric results (for example, see JP-A-2006-237987).

However, even when colors with the same gradation level are printed over the entire surface of a sheet, a little color unevenness occurs in the sheet. This is because there is a small variation in the transport amount of a sheet or the discharge amount of ink droplets when an ink jet printer performs printing.

The degree of color unevenness occurring in the sheet varies depending on the ink color used. For example, in order to improve calibration accuracy, the number of patches of a color having a large degree of color unevenness is increased, and the number of patches of a color having a small degree of color unevenness is decreased. When the number of patches is insufficient, the accuracy of correction by calibration is lowered. When the number of patches is large, the time required for colorimetry is increased. Therefore, it is preferable to appropriately adjust the number of patches of each ink color used.

SUMMARY

An advantage of some aspects of the invention is that it appropriately adjusts the number of patches of each color to be in a test chart used for color calibration.

In order to achieve the object of the invention, according to an aspect of the invention, there is provided a method of determining the number of patches of each color to be in a test chart used for color calibration. The method includes: acquiring the degree of variation in the colorimetric value of a first color and the degree of variation in the colorimetric value of a second color in a color space on a medium; calculating the number of patches of the first color on the basis of the degree of variation in the colorimetric value of the first color; and calculating the number of patches of the second color on the basis of the degree of variation in the colorimetric value of the second color.

According to this aspect, it is possible to appropriately adjust the number of patches of each color to be in the test chart used for color calibration.

In the method of determining the number of patches according to the above-mentioned aspect, preferably, the number of patches of the first color is different from the number of patches of the second color. Preferably, the larger the degree of variation in the colorimetric value is, the larger the number of patches allocated is. Preferably, the degree of variation in the colorimetric value is calculated on the basis of the colorimetric results of the first color and the second color recorded on a plurality of media. Preferably, the degree of variation is calculated by a standard deviation.

Further, preferably, the number of patches of the first color and the number of patches of the second color are calculated on the basis of the lengths of the curved lines of the first color and the second color in the color space. Preferably, the color space is a uniform color space. Preferably, the color space is a CIE L*a*b* color space.

According to the above-mentioned structure, it is possible to appropriately adjust the number of patches of each color to be in the test chart used for color calibration.

BRIEF DESCRIPTION OF THE DRAWINGS

The invention will be described with reference to the accompanying drawings, wherein like numbers reference like elements.

FIG. 5 is a diagram illustrating a test chart having the same number of patches for all ink colors.

FIG. 6 is a diagram illustrating an example of the calculation results of the number of patches.

FIG. 12 is a diagram illustrating an example of the calculation of the number of patches according to the second embodiment.

DESCRIPTION OF EXEMPLARY EMBODIMENTS

First Embodiment

Figure 1:
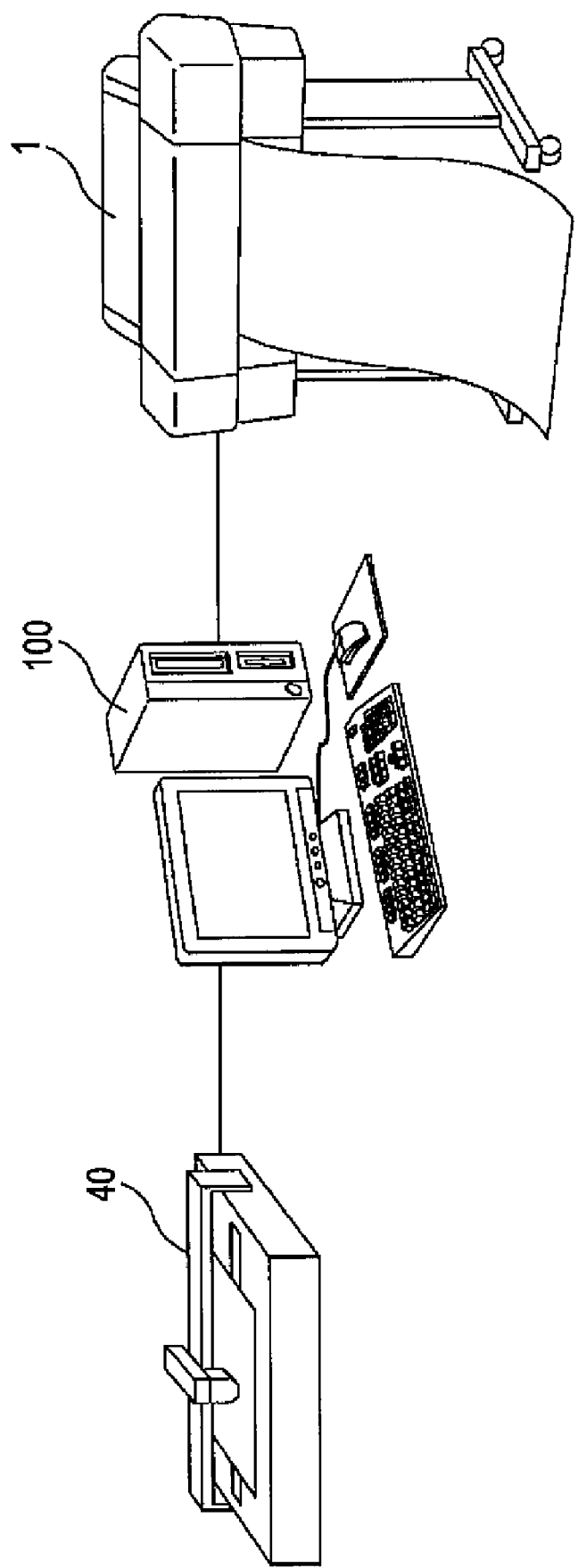
FIG. 1 is a diagram illustrating the structure of a system that determines the number of patches of each ink color in a test chart.

FIG. 1 is a diagram illustrating the structure of a system that determines the number of patches of each ink color to be in a test chart. FIG. 1 shows a computer 100, a printer 1, and a calorimeter 40.

<Colorimeter 40>

Figure 2A:
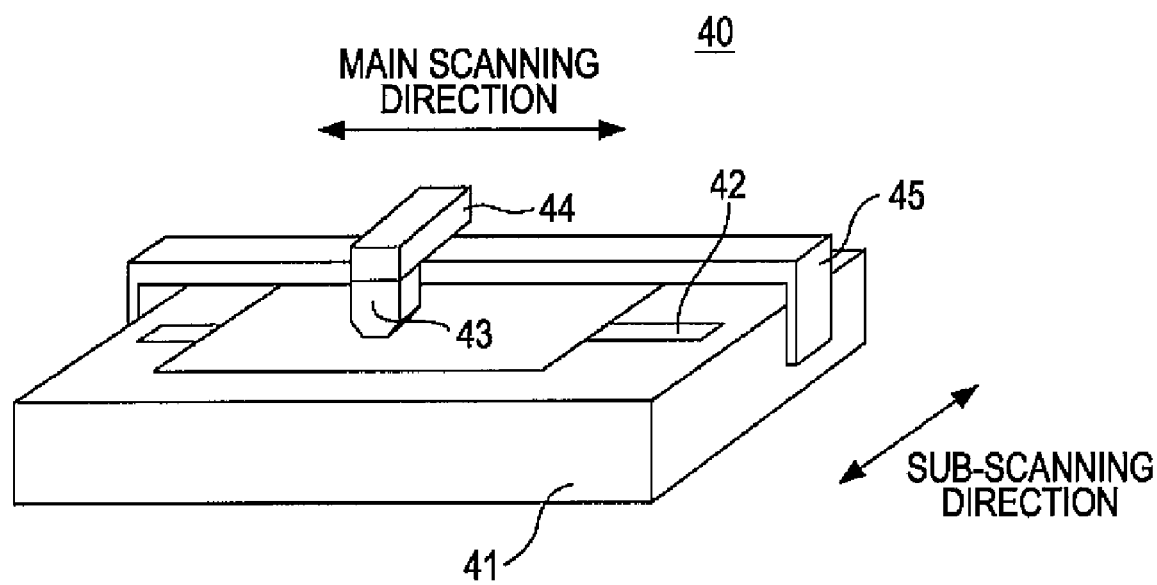
FIG. 2 is a diagram illustrating the structure of a colorimeter 40.
Figure 2B:
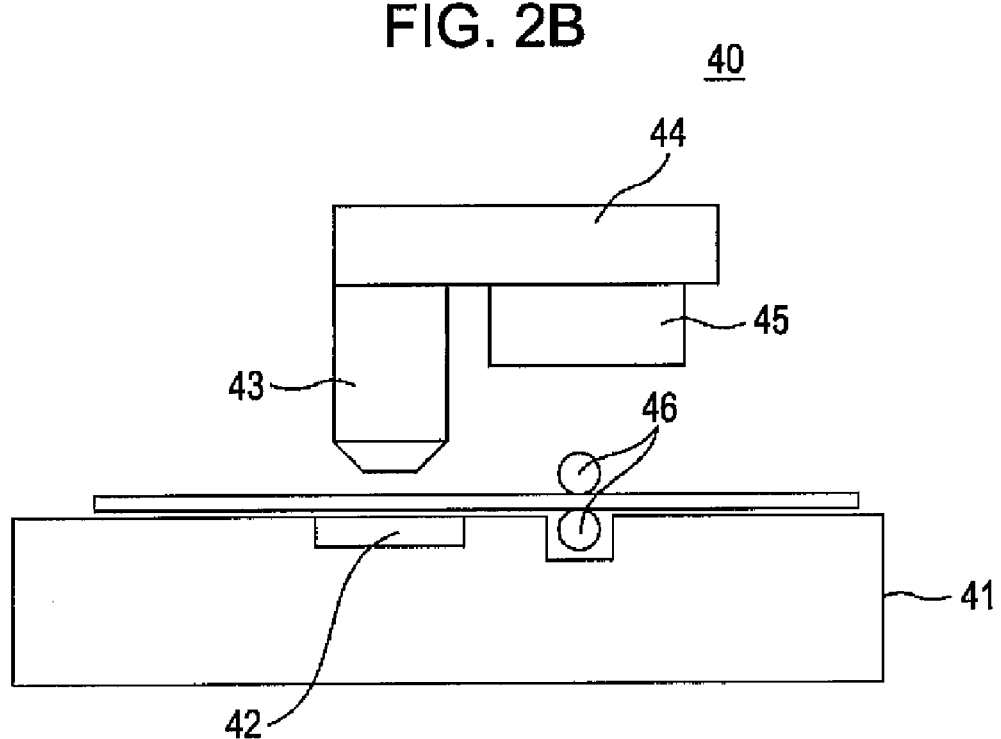

FIG. 2 is a diagram illustrating the structure of the calorimeter 40. FIG. 2 shows the outward appearance of the calorimeter 40. The calorimeter 40 includes a colorimetric table 41, a backing 42, a colorimetric head 43, a calorimeter carriage 44, a rail 45, and a sheet feed roller 46.

The backing 42, which is a white board, is fixed to the colorimetric table 41. The colorimetric head 43 scans a sheet loaded on the backing 42 to perform colorimetry. The calorimeter carriage 44 includes a motor (not shown), and is moved along the rail 45 to move the colorimetric head 43 in a main scanning direction. The sheet feed roller 46 transports the sheet by a predetermined distance in a sub-scanning direction whenever colorimetry in the main scanning direction is completed. The colorimetric head 43 of the calorimeter 40 faces a colorimetric target to detect the color component amounts of a plurality of color components L*, a*, and b* on the basis of a L*a*b* color space in a CIE (1076) standard, and the calorimeter 40 generates colorimetric values L*, a*, and b* corresponding to the detected amounts. That is, when colorimetry is performed at each point, a set of the colorimetric values L*, a*, and b* is obtained. The CIE L*a*b* color space is a uniform color space that does not depend on a device having a plurality of color components L*, a*, and b* as color component amounts. L* is a color coordinate indicating brightness, a is a color coordinate indicating a color, and b* is a color coordinate indicating chroma.

The calorimeter 40 outputs the colorimetric values measured by colorimetry to the computer 100. The color space of the output colorimetric values may be a CIE L*u*v* color space.

<Printer 1>

The printer 1 discharges ink droplets onto a sheet to form an image. The printer 1 is provided with a head that includes a plurality of color inks. The printer 1 discharges ink while intermittently transporting the sheet in a transport direction and moving the head in a direction orthogonal to the transport direction. Then, an image is formed by an aggregate of minute ink droplets that have landed on the sheet. The printer 1 according to this embodiment can discharge eight different inks, that is, cyan C, magenta M, yellow Y, black K, light cyan LC, light magenta LM, light black LK, and light light black LLK.

In this embodiment, the above-mentioned eight color inks are used, but the colors are not limited thereto. The ink used may be pigment ink including a coloring material composed of pigment or dye ink including a coloring material composed of dye. In this embodiment, an ink jet printer is given as an example of the printer, but a color laser printer that uses a plurality of color toners to form an image on a sheet may be used.

<Computer 100>

The computer 100 includes a processor (not shown) and a storage device (not shown). The processor is an arithmetic unit, such as a CPU. In addition, the storage device is, for example, a ROM, a RAM, a hard disk drive, or a CD-ROM drive, and stores a program for executing a method of determining the number of patches, which will be described below. The RAM and the hard disk drive are also used as an area for storing the operation results when the program is executed. The computer 100 is connected to the printer 1 and the calorimeter 40 by an interface. The computer 100 transmits print data to the printer 1 to control the printer 1 to print a desired image. In addition, the computer 100 can output a colorimetric instruction to the calorimeter 40 and acquire the colorimetric results, which will be described below.

<Regarding Color Calibration>

The color output characteristics of individual printers are slightly different from each other. Therefore, color calibration is used to correct the difference in the color output characteristics to improve the color reproducibility of printers. For example, color calibration is performed as follows. First, a printer prints a test chart. Then, the printed test chart is fixed to a colorimeter, and colorimetry is performed on the test chart. Then, the misalignment of the printed color is calculated on the basis of the measured colorimetric value. Then, a translation table for correcting the color misalignment is made. Then, printing is performed using the translation table to correct the color misalignment. In this way, it is possible to perform printing with appropriate colors.

In the following embodiment, the number of patches of each color to be in the test chart used for the color calibration is determined.

Figure 3:
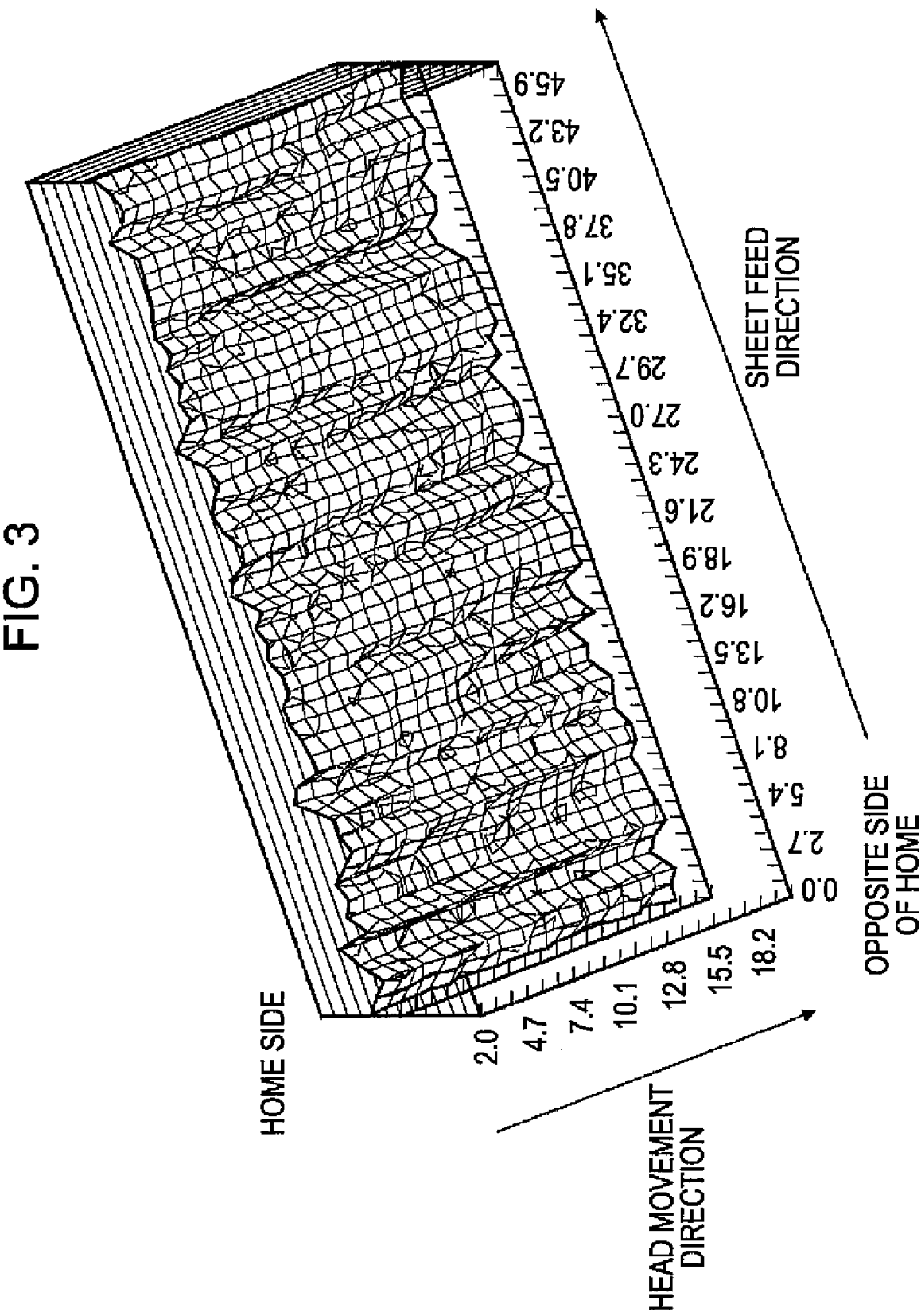
FIG. 3 is a diagram illustrating the degree of color unevenness occurring over the surface of a sheet when an image is printed on the sheet.

FIG. 3 is a diagram illustrating the degree of color unevenness occurring over the surface of a sheet when an image is printed on the sheet.

In FIG. 3, a sheet feed direction means a direction in which a sheet is fed in the printer. In addition, the movement direction of a head of the printer is shown in FIG. 3. A home side in the movement direction of the head means the standby position of the head of the printer, and the side opposite to the home side is represented by a 'side opposite to the home side'. A direction vertical to a plane having the sheet feed direction and the movement direction of the head therein as two axes indicates the degree of color unevenness occurring over the surface of the sheet.

FIG. 3 shows the degree of color unevenness occurring in the sheet when a certain ink color having a certain gradation value is printed over the entire surface of the sheet. The degree of color unevenness is represented by a standard deviation of the average values of the colorimetric values. When the average values of L*, a*, and b* are $L^*_{ave}$, $a^*_{ave}$, and $b^*_{ave}$, the deviation is represented by the following expression:

$$\text{deviation} = \{(L^*_{ave} - L^*)^2 + (a^*_{ave} - a^*)^2 + (b^*_{ave} - b^*)^2\}^{1/2}.$$

In this embodiment, in an L*a*b* color space, the value of $L^*_{ave}$ is 88.0, the value of $a^*_{ave}$ is −8.8, and the value of $b^*_{ave}$ is 58.9.

In this case, it has been found that color unevenness periodically occurs in the sheet feed direction. It is considered that, since a roller for transporting the sheet in the printer 1 is not perfectly circular in cross section, there is a periodic difference in the transportation amount of the sheet, which causes periodic color unevenness.

The color unevenness occurring in the sheet may appear in any ink color, but ink colors have different degrees of color unevenness. That is, there are two kinds of ink colors, that is, an ink color that is more likely to have color unevenness and an ink color that is less likely to have color unevenness. It is preferable to calibrate the ink color that is more likely to have color unevenness using a large number of patches, and calibrate the ink color that is less likely to have color unevenness using a small number of patches. As such, it is possible to effectively arrange the patches of each color on the sheet by changing the number of patches according to the degree of color unevenness of each ink color occurring over the surface of the sheet.

Therefore, in the first embodiment, the number of patches of each ink color is adjusted on the basis of the degree of color unevenness of each ink color occurring over the surface of the sheet.

<Method of Determining Number of Patches>

Figure 4:
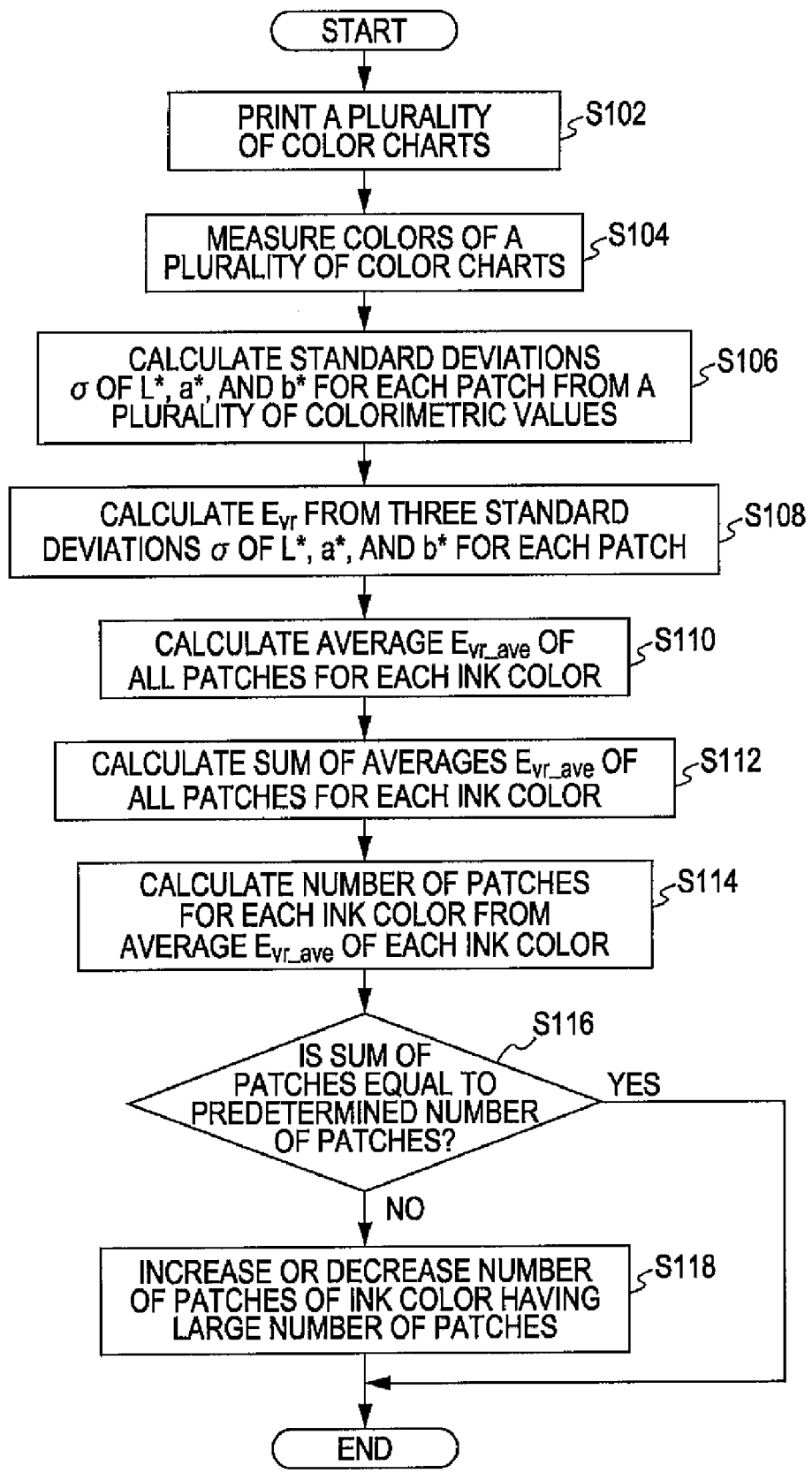
FIG. 4 is a flowchart illustrating a first embodiment of the invention.

FIG. 4 is a flowchart illustrating the first embodiment. Next, a method of determining the number of patches according to the first embodiment will be described with reference to the flowchart.

First, a plurality of test charts (in this embodiment, ten test charts) are printed (S102).

FIG. 5 is a diagram illustrating a test chart in which all ink colors have the same number of patches. In FIG. 5, the patches of yellow Y, black K, light cyan LC, light magenta LM, and light black LK are omitted because of limited space, and an example of the test charts of cyan C, magenta M, and light light black LLK is shown. Therefore, in this embodiment, the patches of eight kinds of ink colors, such as cyan C, magenta M, yellow Y, black K, light cyan LC, light magenta LM, light black LK, and light light black LLK, each having gradation values of 0 to 255, are printed on a sheet. In FIG. 5, numbers indicate the gradation values of each ink color.

In this embodiment, a plurality of test charts are printed in order to calculate the degree of color unevenness occurring over the surface of the sheet. It is preferable that the test chart be output by the printer after the printer has been calibrated.

FIG. 3 shows an example in which one color is printed with the same gradation level for easy understanding of the occurrence of color unevenness during printing. In Step S102, ten test charts with gradation levels of 0 to 255 are printed to obtain 10 data items for each color and each gradation level, and it is possible to calculate the degree of color unevenness of each ink color during printing.

In this way, in the method of determining the number of patches according to this embodiment, the degree of color unevenness occurring in the sheet is measured. A test chart obtained by printing colors with the same gradation level over the entire surface of the sheet may be used.

Then, the colors of the printed test charts are measured (S104). In this case, the colors of the ten test charts are measured. In this way, a colorimetric value corresponding to each patch in each sheet is obtained.

Then, the standard deviations σ of L*, a*, and b* for each patch in the test charts are calculated from the color measurement results of the plurality of test charts (S106). Specifically, the standard deviations of L*, a*, and b* of the patches at the same position in a plurality of sheets are calculated.

The standard deviation of L* is referred to as $\sigma_L$, the standard deviation of a* is referred to as $\sigma_a$, and the standard deviation of b* is referred to as $\sigma_b$. The standard deviation of L* of the patches at the same position in N sheets is calculated by the following expression:

$$\sigma_L = \sqrt{\frac{1}{N}\sum_{i=1}^{N}(\overline{L}L_i)^2},$$

$$\left(\text{where } \overline{L^*} = \frac{\sum_{i=1}^{N} L_i^*}{N}\right).$$

In this embodiment, since colorimetric values can be obtained from ten sheets, N is 10. The standard deviations $\sigma_a$ and $\sigma_b$ of the patches can be calculated by the same expression as described above.

Then, $E_{vr}$ for each patch of each ink color is calculated by the following expression from the standard deviations $\sigma_L$, $\sigma_a$, and $\sigma_b$ of each patch of each color in the test charts (S108). $E_{vr}$ can be calculated by the following expression:

$$E_{vr} = (\sigma_L^2 + \sigma_a^2 + \sigma_b^2)^{1/2}.$$

Then, the average value $E_{vr\_ave}$ of the values $E_{vr}$ of all the patches of each ink color is calculated (S110). Then, the sum of the average values $E_{vr\_ave}$ for all ink colors is calculated (S112).

FIG. 6 is a diagram illustrating an example of the calculation results of the number of patches. FIG. 6 shows the average value $E_{vr\_ave}$ of each ink color and the sum of the average values. In addition, FIG. 6 shows the ratio of the average value $E_{vr\_ave}$ of each ink color to the average value $E_{vr\_ave}$ of all the ink colors and the number of patches calculated on the basis of the average value $E_{vr\_ave}$, which will be described below.

$E_{vr\_ave}$ indicates the degree of color unevenness of each ink color in the sheet. Therefore, the larger the average value becomes, the larger the degree of color unevenness occurring in the sheet becomes. When referring to the ratio of $E_{vr\_ave}$, the ratio of black K is 0.1857, which is the largest value. Therefore, among the color inks used in this embodiment, the degree of color unevenness of black K in the sheet is the largest. On the other hand, the ratio of light light black LLK is 0.0676, which is the smallest value. Therefore, among the color inks used in this embodiment, the degree of color unevenness of light light black LLK in the sheet is the smallest.

Then, the number of patches of each ink color is calculated from the degree of color unevenness $E_{vr\_ave}$ of each ink color (S114). The number of patches of each ink color is calculated from $E_{vr\_ave}$ by the following expression:

the number of patches=(the total number of patches−the number of ink colors)×($E_{vr\_ave}$ of a corresponding ink color)/(the sum of the values $E_{vr\_ave}$ of all ink colors)+1.

For example, when the number of patches of cyan C is calculated, the following values are substituted into the above-mentioned expression: the total number of patches: 300; the number of ink colors: 8; $E_{vr\_ave}$ of a corresponding ink color: 0.8918; and the sum of the values $E_{vr\_ave}$ of all ink colors: 6.6367. As a result, as shown in FIG. 6, the number of patches of cyan C is 40.31192. In this way, the number of patches of each color is calculated.

However, the number of patches needs to be a natural number. Therefore, the calculated number of patches is rounded off to the nearest whole number. For example, the number of patches of cyan C is rounded off to 40. In this way, the number (natural number) of patches of each ink color is calculated.

Then, it is determined whether the calculated total number of patches is equal to a predetermined number of patches (S116). This is because the calculated total number of patches of each ink color is likely to be larger or smaller than a predetermined number of patches due to the rounding-off of the decimal point. If it is determined that the calculated total number of patches is equal to the predetermined number of patches, this process ends.

On the other hand, if it is determined that the calculated total number of patches is not equal to the predetermined number of patches, the number of patches of an ink color having a large number of patches is increased or decreased to make the total number of patches equal to the predetermined number of patches (S118). In FIG. 6, the calculated number of patches of black K is 55.70127, and is rounded off to 56. In this case, the calculated total number of patches of all the ink colors is 299. However, this value is not equal to 300, which is a predetermined number of patches. Therefore, 1 is added to the number of patches of black K, which is an ink color having the largest number of patches, to increase the number of patches to 57. In this way, the number of patches is adjusted such that the total number of patches is equal to a predetermined number of patches.

In this way, it is possible to determine the number of patches of each ink color on the basis of the degree of color unevenness occurring over the surface of the sheet. Then, patches for each ink color are made using the calculated number of patches. In this case, the patches are allocated such that the gap between the gradation values is constant. In this way, it is possible to make a test chart having patches corresponding to the degree of color unevenness of each ink color occurring in the sheet. As a result, it is possible to prepare an effective test chart in which the number of patches of an ink color having a large degree of color unevenness is increased and the number of patches of an ink color having a small degree of color unevenness is decreased.

Second Embodiment

<For CIE L*a*b* Space>

A CIE L*a*b* color space is a uniform color space. In the uniform color space, a geometrical difference between two colors in a color space coordinate system is equal to a perceptional difference between the two colors.

Figure 7:
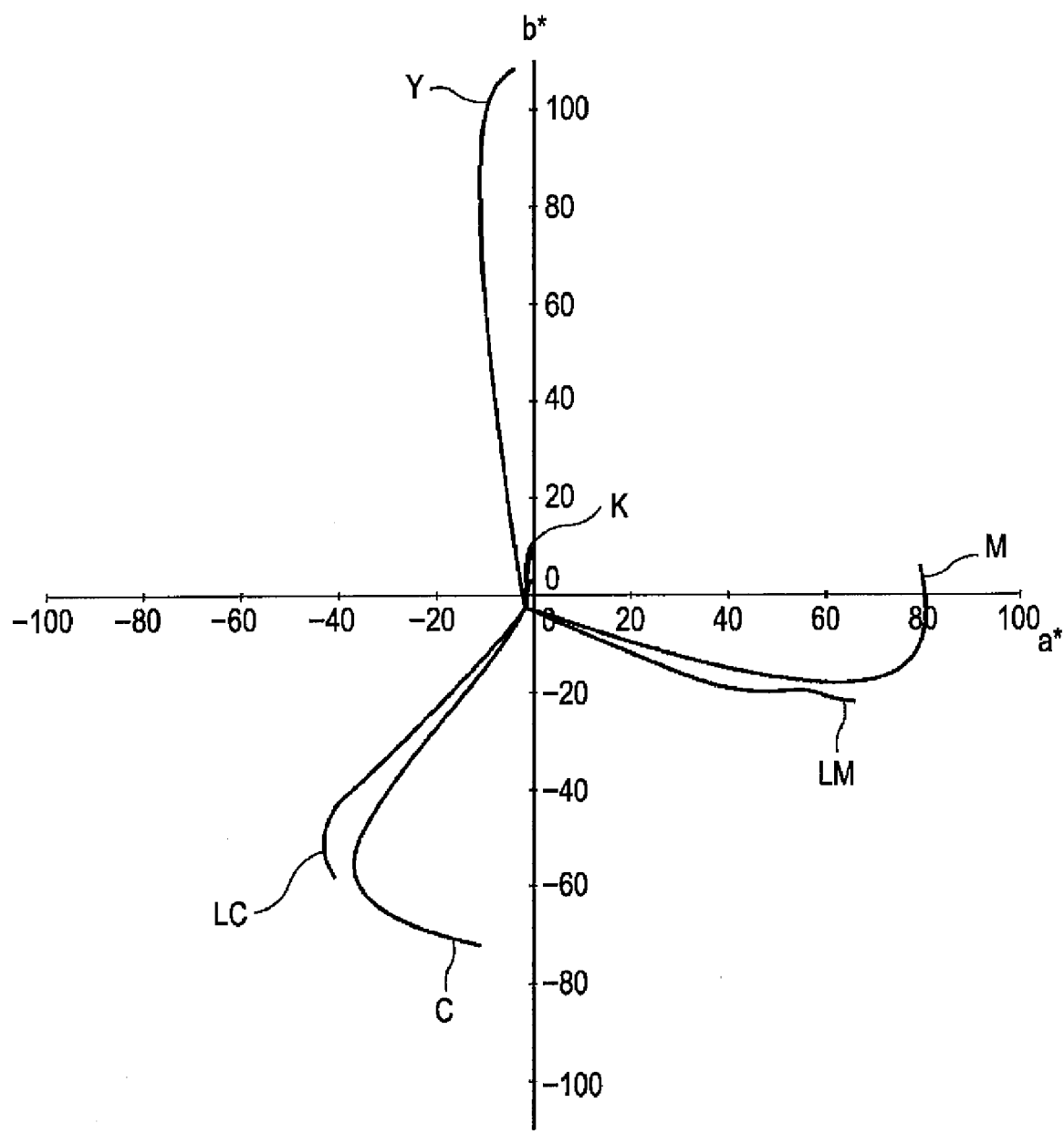
FIG. 7 is a diagram illustrating an example of a CIE L*a*b* color space, as viewed from L*=100 in an a*b* coordinate direction.
Figure 8:
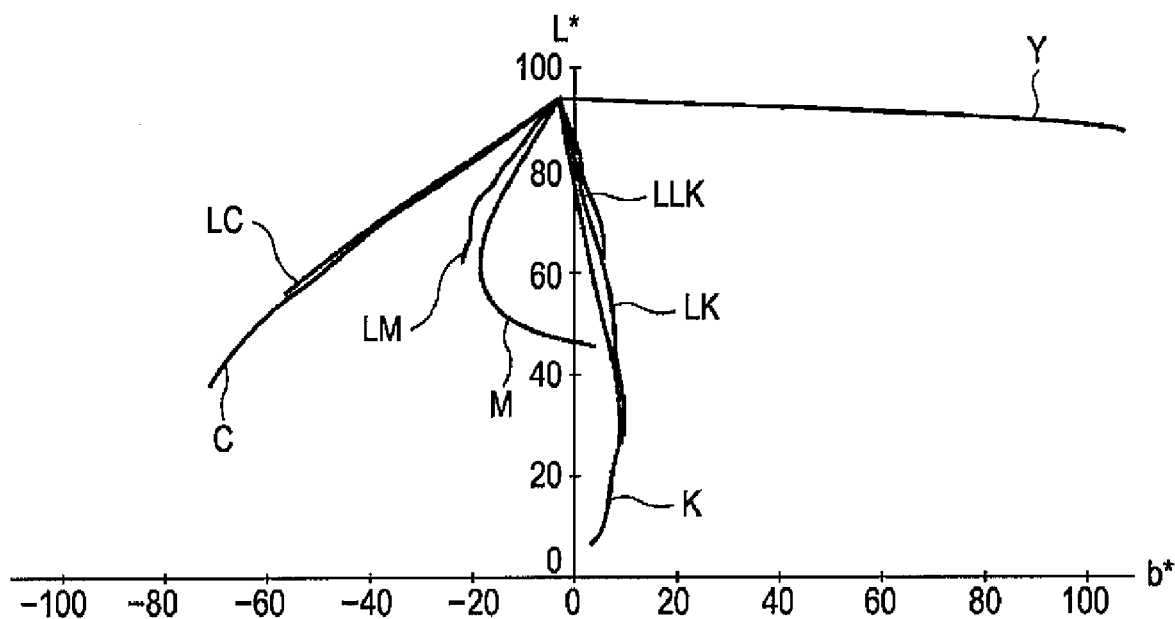
FIG. 8 is a diagram illustrating another example of the CIE L*a*b* color space, as viewed from a*=120 in an L*b* coordinate direction.
Figure 9:
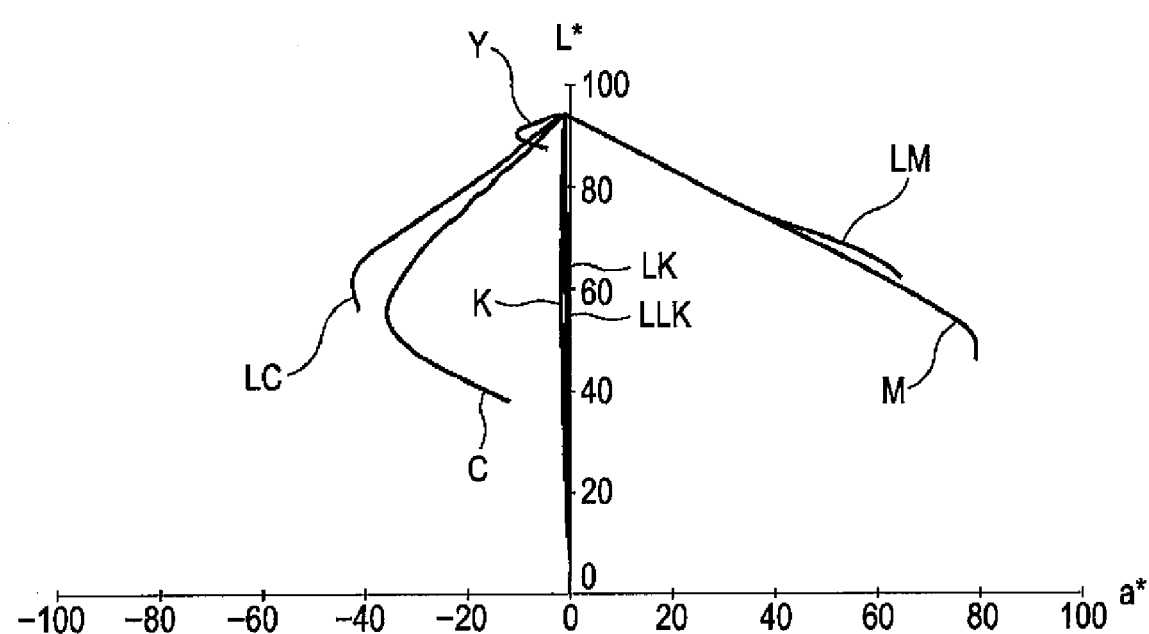
FIG. 9 is a diagram illustrating still another example of the CIE L*a*b* color space, as viewed from b*=120 in an L*a* coordinate direction.
Figure 10:
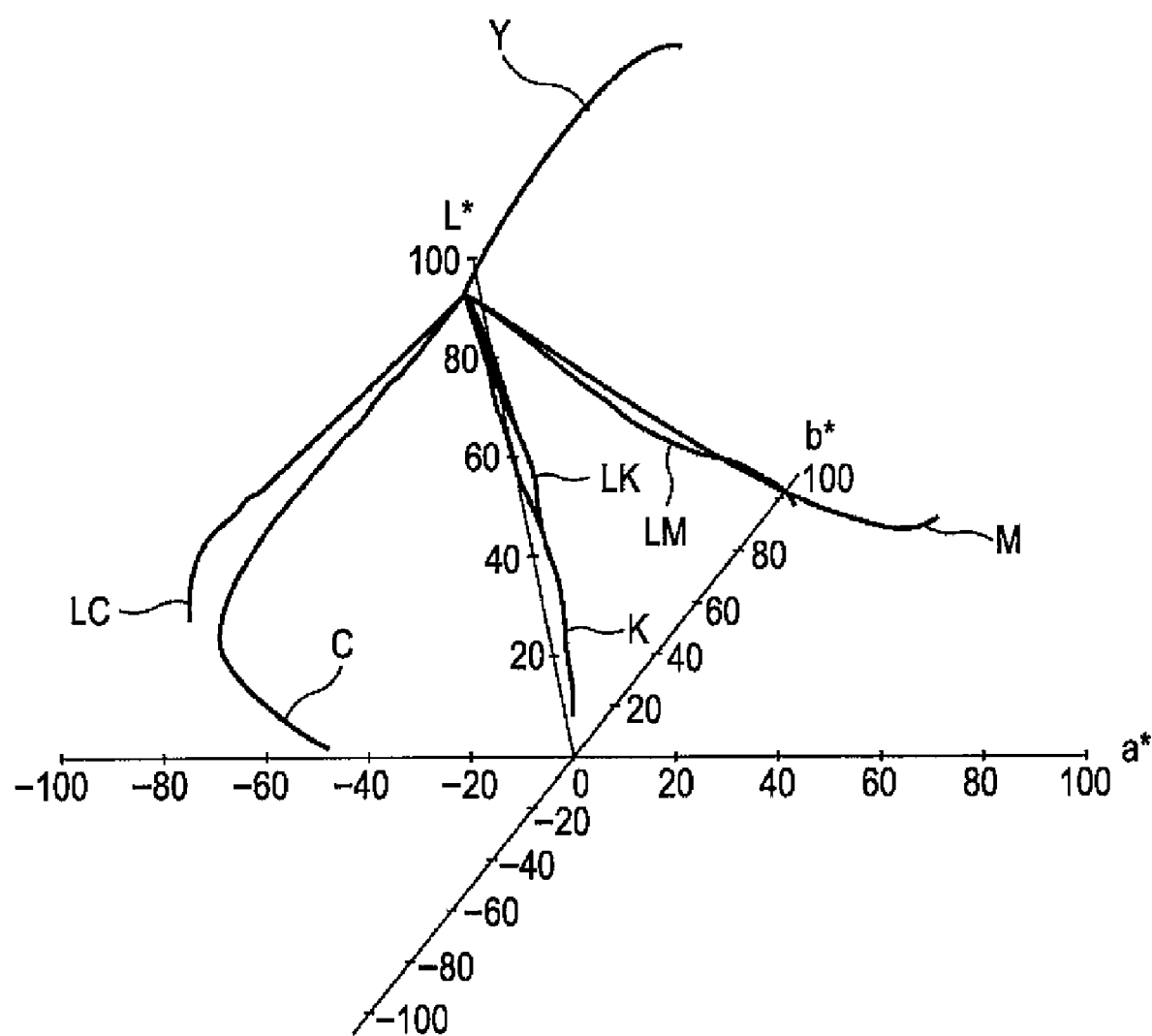
FIG. 10 is a diagram illustrating an example of a three-dimensional CIE L*a*b* color space.

FIG. 7 is a diagram illustrating an example of the CIE L*a*b* color space, as viewed from L*=100 in an a*b* coordinate direction. FIG. 8 is a diagram illustrating another example of the CIE L*a*b* color space, as viewed from a*=120 in an L*b* coordinate direction. FIG. 9 is a diagram illustrating still another example of the CIE L*a*b* color space, as viewed from b*=120 in an L*a* coordinate direction. FIG. 10 is a diagram illustrating an example of a three-dimensional CIE L*a*b* color space. This embodiment shows paths obtained by plotting the colorimetric values of the ink colors included in the printer 1 (cyan C, magenta M, yellow Y, black K, light cyan LC, light magenta LM, light black LK, and light light black LLK) in the CIE L*a*b* color space.

Referring to FIGS. 7 to 10, the paths of the ink colors in the color space are different from each other, and curved lines have different lengths. As described above, the CIE L*a*b* color space is a uniform color space, and a distance in the color space indicates a color difference. When the length of the curved line is large, a color difference between the gradation levels is large. When the length of the curved line is small, a color difference between the gradation levels is small.

For example, in FIGS. 7 to 10, the length of the curved line of yellow Y is lager than that of the curved line of light black LK. Therefore, the color difference between the gradation values of yellow Y is larger than the color difference between the gradation values of light black LK.

As such, there are two kinds of ink colors, that is, an ink color having a large color difference between the gradation values and an ink color having a relatively small color difference between the gradation values. In color calibration, color misalignment is corrected on the basis of the colorimetric results. However, when colorimetry is performed on the same number of patches of each ink color under the above-mentioned conditions, the distance between the colorimetric values of an ink color having a small color difference between the gradation levels in the L*a*b* color space is small, but the distance between the colorimetric values of an ink color having a large color difference between the gradation levels in the L*a*b* color space is large.

When the color differences between the gradation levels of the colors are different from each other, the number of patches of a color having a large color difference may be increased, and the number of patches of a color having a small color difference may be decreased. When the number of patches is insufficient, the accuracy of correction by calibration is lowered. When the number of patches is large, the time required for colorimetry is increased. Therefore, it is preferable to appropriately adjust the number of patches of each ink color used. In the following flowchart according to the second embodiment, the number of patches is determined considering the length of the curved line of each ink color in the L a*b* color space as well as the degree of color unevenness occurring over the surface of a sheet.

<Method of Determining Number of Patches>

Figure 11:
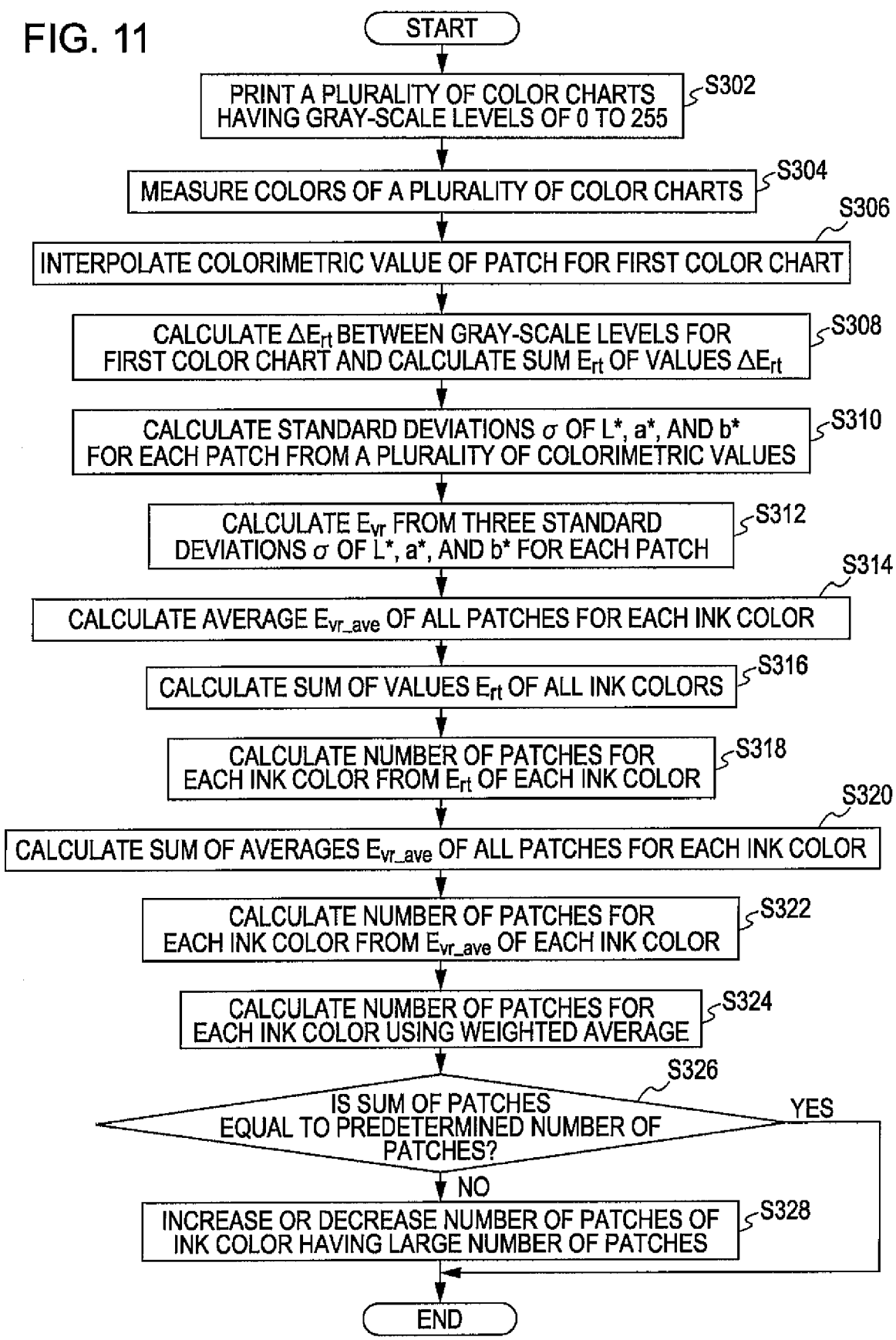
FIG. 11 is a flowchart illustrating a second embodiment of the invention.

FIG. 11 is a flowchart illustrating the second embodiment. Next, a method of determining the number of patches according to the second embodiment will be described with reference to the flowchart. In the second embodiment, the number of patches is calculated considering the length of the curved line of each ink color in the L*a*b* color space and the degree of color unevenness occurring over the surface of a sheet.

First, a plurality of test charts (in this embodiment, ten test charts) having gradation levels of 0 to 255 are printed (S302). The printed test charts are the same as those shown in FIG. 5.

In this embodiment, ten test charts with gradation levels of 0 to 255 are printed to obtain 10 data items for each color and each gradation level, and it is possible to calculate the degree of color unevenness of each ink color during printing.

Then, the colors of the printed test charts are measured (S304). In this case, the colors of the ten test charts are measured. In this way, a colorimetric value corresponding to each patch in each sheet is obtained.

Then, a colorimetric value interpolated between the patches is calculated for the first one of the ten test charts (S306). When the head of the printer prints the patches having different gradation levels of the test charts, the characteristics of the head are likely to vary. Therefore, originally, one patch has a constant colorimetric value, but actually, slight color unevenness occurs. Therefore, in this embodiment, polynomial interpolation is performed using the values of L*, a*, and b* of a plurality of adjacent patches to obtain the colorimetric value of each patch. However, in this embodiment, the polynomial interpolation is performed to obtain the colorimetric value of each patch, but the moving average of the colorimetric values of a plurality of adjacent patches may be calculated to obtain the colorimetric value of each patch.

Further, in this embodiment, the interpolated colorimetric value is calculated for only the first test chart. This is because the other nine test charts are printed in order to calculate the degree of color unevenness occurring over the surface of the sheet.

Then, a colorimetric value distance $\Delta E_{rt}$ between the gradation levels is calculated for the first test chart, and the sum $E_{rt}$ of the colorimetric value distances $\Delta E_{rt}$ of all ink colors is calculated (S308). It is assumed that, when the gradation value is k, the value of L* is $L_k^*$, the value of a* is $a_k^*$, and the value of b* is $b_k^*$. In this case, the colorimetric value distance $\Delta E_{rt}$ between the gradation levels is represented by the following expression:

$$\Delta E_{rt} = \{(L_{k+1}^* - L_k^*)^2 + (a_{k+1}^* - a_k^*)^2 + (b_{k+1}^* - b_k^*)^2\}^{1/2}.$$

The colorimetric value distance $\Delta E_{rt}$ is a color difference between the gradation levels.

Then, the sum $E_{rt}$ (the length of the curved line of the colorimetric value) of the colorimetric value distances $\Delta E_{rt}$ of all ink colors is calculated. In this way, it is possible to calculate the length $E_{rt}$ of the curved line of each ink color in the L*a*b* color space.

FIG. 12 is a diagram illustrating an example of the calculation of the number of patches according to the second embodiment. FIG. 12 shows an ink color and the length $E_{rt}$ of the curved line of each ink color in the L*a*b* color space. For example, the length of the curved line of the colorimetric value of cyan C in the L*a*b* color space is 119.618. In addition, FIG. 12 shows the number of patches of each ink color, which will be described below.

Then, the standard deviations a of L*, a*, and b* for each patch in the test charts are calculated from the color measurement results of the plurality of test charts (S310). Specifically, the standard deviations of L*, a*, and b* of the patches at the same position in a plurality of sheets are calculated. In this embodiment, in order to calculate the degree of color unevenness, the colorimetric value calculated by interpolation is not used, but the colorimetric value before interpolation is used.

The standard deviation of L* is referred to as $\sigma_L$, the standard deviation of a* is referred to as $\sigma_a$, and the standard deviation of b* is referred to as $\sigma_b$. The standard deviation of L* of the patches at the same position in N sheets is calculated by the following expression:

$$\sigma_L = \sqrt{\frac{1}{N}\sum_{i=1}^{N}(\overline{L^*} - L_i^*)^2},$$

$$\left(\text{where } \overline{L^*} = \frac{\sum_{i=1}^{N} L_i^*}{N}\right).$$

In this embodiment, since colorimetric values can be obtained from ten sheets, N is 10. The standard deviations $\sigma_a$ and $\sigma_b$ of the patches can be calculated by the same expression as described above.

Then, $E_{vr}$ of each patch of each ink color is calculated by the following expression from the standard deviations $\sigma_L$, $\sigma_a$, and $\sigma_b$ of each patch of each color in the test charts (S312). $E_{vr}$ can be calculated by the following expression:

$$E_{vr}=(\sigma_L^2+\sigma_a^2+\sigma_b^2)^{1/2}.$$

Then, the average value $E_{vr\_ave}$ of the values $E_{vr}$ of all the patches for each ink color is calculated (S314). In this embodiment, since the colorimetric results of the test charts according to the first embodiment are used, the calculated results are the same as those shown in FIG. 6 in the first embodiment. FIG. 6 shows the average value $E_{vr\_ave}$ of each ink color.

Then, the sum of the lengths $E_{rt}$ of the curved lines of the colorimetric values of all the eight color inks in the L*a*b* color space is calculated (S316). That is, the sum of the lengths of the curved lines of cyan C, magenta M, yellow Y, black K, light cyan LC, light magenta LM, light black LK, and light light black LLK in the L*a*b* color space is calculated. In FIG. 12, the calculated result 740.1767 is written in the field 'total'.

Then, the number of patches allocated to each ink color is calculated (S318). The number of patches allocated to each ink color is calculated on the basis of the length of the curved line of each color in the L*a*b* color space by the following expression:

the number of patches=(the total number of patches−the number of ink colors)×($E_{rt}$ of a corresponding ink color)/(the sum of the values $E_{rt}$ of all ink colors)+1.

The numeral value of each ink color is substituted into the above-mentioned expression, and the calculated results are written in the field 'calculation' of 'the number of patches calculated from $E_{rt}$'. For example, as the calculation result of cyan C, a value of 48.18935 is written in the field. In this way, the number of patches of each ink color is calculated from $E_{rt}$.

Then, the sum of the average values $E_{vr\_ave}$ of all the ink colors is calculated (S320). In FIG. 6, the sum of the average values $E_{vr\_ave}$ of all the ink colors is 6.6367. In addition, FIG. 6 shows the ratio of the average value $E_{vr\_ave}$ of each ink color to the average value $E_{vr\_ave}$ of all the ink colors and the number of patches calculated on the basis of the average value $E_{vr\_ave}$, which will be described below.

Then, the number of patches of each ink color is calculated from the degree of unevenness $E_{vr\_ave}$ of each ink color (S322). The following expression is used to calculate the number of patches of each ink color from $E_{vr\_ave}$:

the number of patches=(the total number of patches−the number of ink colors)×($E_{vr\_ave}$ of a corresponding ink color)/(the sum of the values $E_{vr\_ave}$ of all ink colors)+1.

For example, when the number of patches of cyan C is calculated, the following values are substituted into the above-mentioned expression: the total number of patches: 300; the number of ink colors: 8; $E_{vr\_ave}$ of a corresponding ink color: 0.8918; and the sum of the values $E_{vr\_ave}$ of all ink colors: 6.6367. As a result, as shown in FIG. 6, the calculated number of patches of cyan C is 40.31192. In this way, the number of patches of each color is calculated.

Then, the number of patches is calculated considering the length of the curved line in the L*a*b* color space and the degree of color unevenness in the sheet (S324). In this case, the number of patches is calculated using the weighted average of the number of patches calculated from $E_{rt}$ and the number of patches calculated from $E_{vr}$. For simplicity of description, in this embodiment, the average of the number of patches calculated from $E_{rt}$ and the number of patches calculated from $E_{vr}$ is calculated.

For example, the number of patches of cyan C calculated from $E_{rt}$ is 48.18935. In addition, the number of patches of cyan C calculated from $E_{vr}$ is 40.31192. The average of these values is 44.25064. In this way, the number of patches of each color is calculated.

However, the number of patches needs to be a natural number. Therefore, the calculated number of patches is rounded off to the nearest whole number. For example, the number of patches of cyan C is rounded off to 44. In this way, the number (natural number) of patches of each ink color is calculated.

Then, it is determined whether the calculated total number of patches is equal to a predetermined number of patches (S326). This is because the calculated total number of patches of each ink color is likely to be larger or smaller than a predetermined number of patches (300 in FIG. 12). If it is determined that the calculated total number of patches is equal to the predetermined number of patches, this process ends.

On the other hand, if it is determined that the calculated total number of patches is not equal to the predetermined number of patches, the number of patches of an ink color having a large number of patches is increased or decreased to make the total number of patches equal to the predetermined number of patches (S328). In FIG. 12, the calculated number of patches of magenta M is 48.73036, and is rounded off to 49. In this case, the calculated total number of patches of all the ink colors is 299. However, this value is not equal to 300, which is a predetermined number of patches. Therefore, 1 is added to the number of patches of magenta M, which is an ink color having the largest number of patches, to increase the number of patches to 50. In this way, the number of patches is adjusted such that the total number of patches is equal to a predetermined number of patches.

In this way, it is possible to determine the number of patches considering the length of the curved line of each ink color in the L*a*b* color space as well as the degree of color unevenness occurring over the surface of a sheet.

Other Embodiments

The above-described embodiments are given for easy understanding of the invention, but the invention is not limited thereto. Various modifications and changes of the invention can be made without departing from the scope and spirit of the invention, and the invention also includes equivalents thereof.

What is claimed is:

1. A test chart used for color calibration comprising:
a number of patches of a first color; and
a number of patches of a second color, wherein
the number of patches of the first color is determined on the basis of the degree of variation in the colorimetric value of the first color in a color space on a medium,
the number of patches of the second color is determined on the basis of the degree of variation in the colorimetric value of the second color in the color space on the medium, and
the degree of variation in the colorimetric value is calculated on the basis of the colorimetric results of the first color and the second color recorded on a plurality of media.

2. The test chart according to claim 1, wherein the number of patches of the first color is different from the number of patches of the second color.

3. The test chart according to claim 1, wherein the larger the degree of variation in the colorimetric value is, the larger the number of patches allocated is.

4. The test chart according to claim 1, wherein the degree of variation is calculated by using a standard deviation.

5. The test chart according to claim 1, wherein the color space is a uniform color space.

6. The test chart according to claim 1, wherein the color space is a CIE L*a*b* color space.

7. A test chart used for color calibration comprising:
a number of patches of a first color; and
a number of patches of a second color, wherein
the number of patches of the first color is determined on the basis of the degree of variation in the colorimetric value of the first color in a color space on a medium,
the number of patches of the second color is determined on the basis of the degree of variation in the colorimetric value of the second color in the color space on the medium, and
the number of patches of the first color and the number of patches of the second color are calculated on the basis of the lengths of curved lines of the first color and the second color in the color space.

8. The test chart according to claim 7, wherein the number of patches of the first color is different from the number of patches of the second color.

9. The test chart according to claim 7, wherein the larger the degree of variation in the colorimetric value is, the larger the number of patches allocated is.

10. The test chart according to claim 7, wherein the degree of variation is calculated by using a standard deviation.

11. The test chart according to claim 7, wherein the color space is a uniform color space.

12. The test chart according to claim 7, wherein the color space is a CIE L*a*b* color space.

13. A color calibration method comprising:
measuring the color of a test chart in which the number of patches of a first color is determined on the basis of the degree of variation in the colorimetric value of the first color in a color space on a medium and the number of patches of a second color is determined on the basis of the degree of variation in the colorimetric value of the second color in the color space on the medium, wherein the degree of variation in the colorimetric value is calculated on the basis of the colorimetric results of the first color and the second color recorded on a plurality of media; and
performing color calibration on the basis of the color measurement results of the test chart.

14. A color calibration method comprising:
measuring the color of a test chart in which the number of patches of a first color is determined on the basis of the degree of variation in the colorimetric value of the first color in a color space on a medium and the number of patches of a second color is determined on the basis of the degree of variation in the colorimetric value of the second color in the color space on the medium, wherein the number of patches of the first color and the number of patches of the second color are calculated on the basis of the lengths of curved lines of the first color and the second color in the color space; and
performing color calibration on the basis of the color measurement results of the test chart.

15. A color printer comprising:
a connector connectable to a computer; and
a head printing a test chart,
wherein the test chart comprises:
a number of patches of a first color; and
a number of patches of a second color, wherein
the number of patches of the first color is determined on the basis of the degree of variation in the colorimetric value of the first color in a color space on a medium,
the number of patches of the second color is determined on the basis of the degree of variation in the colorimetric value of the second color in the color space on the medium, and
the number of patches of the first color and the number of patches of the second color are calculated on the basis of the lengths of curved lines of the first color and the second color in the color space.

16. A color printer comprising:
a connector connectable to a computer; and
a head printing a test chart;
wherein the test chart comprises:
a number of patches of a first color; and
a number of patches of a second color, wherein
the number of patches of the first color is determined on the basis of the degree of variation in the colorimetric value of the first color in a color space on a medium,
the number of patches of the second color is determined on the basis of the degree of variation in the colorimetric value of the second color in the color space on the medium, and
the number of patches of the first color and the number of patches of the second color are calculated on the basis of the lengths of curved lines of the first color and the second color in the color space.

* * * * *